US009223088B2

(12) United States Patent
Kobayashi et al.

(10) Patent No.: US 9,223,088 B2
(45) Date of Patent: Dec. 29, 2015

(54) METHOD FOR MANUFACTURING SEMICONDUCTOR OPTICAL DEVICE

(71) Applicant: SUMITOMO ELECTRIC INDUSTRIES, LTD., Osaka (JP)

(72) Inventors: Hirohiko Kobayashi, Machida (JP); Yoshihiro Yoneda, Isehara (JP); Hideki Yagi, Machida (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/267,175

(22) Filed: May 1, 2014

(65) Prior Publication Data

US 2015/0277046 A1    Oct. 1, 2015

(30) Foreign Application Priority Data

May 1, 2013    (JP) .................................. 2013-096268

(51) Int. Cl.
| | |
|---|---|
| *H01L 21/00* | (2006.01) |
| *G02B 6/132* | (2006.01) |
| *G02B 6/136* | (2006.01) |
| *G02F 1/025* | (2006.01) |

(52) U.S. Cl.
CPC ................ *G02B 6/132* (2013.01); *G02B 6/136* (2013.01); *G02F 1/025* (2013.01)

(58) Field of Classification Search
CPC ........ H01S 5/2275; H01S 5/176; G02F 1/025
See application file for complete search history.

(56) References Cited

U.S. PATENT DOCUMENTS

| | | | |
|---|---|---|---|
| 2004/0147054 A1* | 7/2004 | Haberern et al. | ................ 438/39 |
| 2010/0303115 A1* | 12/2010 | Yagi et al. | ................ 372/46.012 |
| 2012/0148184 A1* | 6/2012 | Yoneda et al. | .................... 385/2 |

FOREIGN PATENT DOCUMENTS

JP    08-220358    8/1996

* cited by examiner

*Primary Examiner* — Duy T Nguyen
*Assistant Examiner* — Mounir Amer
(74) *Attorney, Agent, or Firm* — Smith, Gambrell & Russell LLP.

(57) ABSTRACT

A method for manufacturing a semiconductor optical device includes the steps of forming a semiconductor mesa by etching a stacked semiconductor layer, the semiconductor mesa being defined by two grooves, one on each side of the semiconductor mesa; forming a first insulating film on a side surface and a top surface of the semiconductor mesa; forming a resin film on the first insulating film, the resin film filling the grooves; etching the resin film on the semiconductor mesa to form a first opening in the resin film, the first insulating film being exposed through the first opening; etching the first insulating film exposed through the first opening to expose the top surface of the semiconductor mesa; depositing an ohmic metal on the top surface of the semiconductor mesa; and depositing a second insulating film on the ohmic metal and a surface of the resin film.

11 Claims, 10 Drawing Sheets

METHOD FOR MANUFACTURING SEMICONDUCTOR OPTICAL DEVICE

BACKGROUND OF THE INVENTION

1. Field of the Invention

The present invention relates to a method for manufacturing a semiconductor optical device.

2. Description of the Related Art

A semiconductor optical device such as an optical modulator which includes a semiconductor mesa buried by a resin, for instance, benzocyclobutene (hereafter denoted as BCB) resin, has been known in the field. Patent Document 1 (Japanese Unexamined Patent Application Publication No. H08-220358) has disclosed a method to produce a semiconductor optical device containing an optical waveguide. In the method disclosed in the Patent Document 1, after forming two grooves (stripe-shaped grooves) at both sides of a ridge waveguide, a protective layer covering the ridge waveguide and the grooves is formed. Then, the grooves are filled with polyimide resin.

SUMMARY OF THE INVENTION

In the method for manufacturing the semiconductor optical device including the semiconductor mesa buried by the resin, a resin region burying the semiconductor mesa is formed. Then, an opening is formed in the resin region to expose a top surface of the semiconductor mesa. An insulating layer is formed on a top surface of the resin region, side surfaces of the opening and the top surface of the semiconductor mesa exposed through the opening to protect surfaces thereof. After an opening is formed in the insulating layer to expose the top surface of the semiconductor mesa, an electrode is formed on the top surface of the semiconductor mesa so as to electrically contact with the top surface of the semiconductor mesa.

During the formation of the insulating film on the top surface of the resin region and subsequent processes, the resin region is needed to be maintained in a temperature thereof below a curing temperature of about 300° C. Therefore, a sputtering is used to deposit the insulating film. The sputtering causes substantially no temperature increase, or keeps the temperature of the resin material below the curing temperature.

In addition, the insulating film covering the top surface of the resin region is necessary to enhance the adhesion to the resin region. The sputtering method improves the adhesion of the sputtered insulating film on the resin region because of the inherent function of the plasma cleaning on a surface to be deposited. However, the sputtering, in particular, the plasma cleaning thereof possibly induces plasma damages on the exposed top surface of the semiconductor mesa, which increases the contact resistance between the deposited metal and the top semiconductor layer of the semiconductor mesa.

A method for manufacturing a semiconductor optical device according to the present invention includes the steps of (a) forming a stacked semiconductor layer on a substrate; (b) forming a semiconductor mesa on the substrate by etching the stacked semiconductor layer, the semiconductor mesa being defined by two grooves in both sides of the semiconductor mesa; (c) forming a first insulating film on a side surface and a top surface of the semiconductor mesa; (d) forming a resin film on the first insulating film, the resin film filling the grooves in both sides of the semiconductor mesa; (e) etching the resin film on the semiconductor mesa to form a first opening in the resin film, the first insulating film being exposed through the first opening; (f) etching the first insulating film exposed through the first opening to expose the top surface of the semiconductor mesa; (g) depositing an ohmic metal on the top surface of the semiconductor mesa; and (h) depositing a second insulating film on the ohmic metal and a surface of the resin film.

According to the method for manufacturing a semiconductor optical device, in the step of depositing the second insulating film, the top surface of the semiconductor mesa is covered with the ohmic metal. The top surface of the semiconductor mesa is not exposed during the formation of the second insulating film. Therefore, no damage provides in the top semiconductor layer (contact layer) of the semiconductor mesa. Therefore, the increase of the contact resistance is effectively suppressed.

In the method for manufacturing a semiconductor optical device according to the present invention, in the step of forming the resin film, the resin film may include benzocyclobutene (BCB) resin. In addition, the second insulating film may contain silicon. The step of depositing the second insulating film may include a step of depositing the second insulating film by sputtering.

According to the method for manufacturing a semiconductor optical device, the second insulating film is formed on the resin film by sputtering. The sputtering suppresses the rise of the temperature of the resin film. Therefore, the formation of the second insulating film by using the sputtering method prevents the resin film from deteriorating or degenerating thermally. On the other hand, the sputtering inherently induces substantial damages on the surface of the semiconductor layer to be deposited with the insulating film thereon compared with the thermal CVD. However, as described above, the top surface of the semiconductor mesa is protected with the ohmic metal during the formation of the second insulating film. Therefore, no damage provides in the top semiconductor layer (contact layer) of the semiconductor mesa even when the second insulating film is formed by the sputtering. In addition, the sputtering method improves the adhesion of the second insulating film to the resin film.

In the method for manufacturing a semiconductor optical device according to the present invention, the step of depositing the first insulating film may include a step of depositing the first insulating film by thermal chemical vapor deposition (CVD) technique. The thermal CVD can form the first insulating film with substantially no damage on the top surface of the semiconductor mesa during the formation thereof. Therefore, the increase of the contact resistance is effectively suppressed.

In the method for manufacturing a semiconductor optical device according to the present invention, the step of depositing the ohmic metal may include a step of depositing a metal containing gold (Au). According to the method for manufacturing a semiconductor optical device, the ohmic metal is made of material containing gold (Au). Therefore, the ohmic metal protects the top surface of the semiconductor mesa from being damaged during the etching of the second insulating film.

The method for manufacturing a semiconductor optical device according to the present invention may further include the steps of etching the second insulating film on the top surface of the semiconductor mesa to form a second opening, the ohmic metal being exposed through the second opening; depositing a barrier metal containing titanium (Ti) on the ohmic metal and the second insulating film; and forming a pad on the barrier metal.

According to the method for manufacturing a semiconductor optical device, the barrier metal is formed on the second insulating film. In addition, the pad is formed on the barrier metal. Therefore, the pad is formed on the resin film through the barrier metal and the second insulating film. Because the barrier metal is made of material containing titanium (Ti), the adhesive of the barrier metal to the second insulating film is enhanced. Therefore, the peeling of the barrier metal off from the second insulating film is effectively suppressed. The wire-bonding to the pad is securely carried out.

In the method for manufacturing a semiconductor optical device according to the present invention, in the step of etching the resin film, the first opening may have a width larger than a width of the top surface of the semiconductor mesa. In addition, the step of etching the first insulating film may include a step of etching the first insulating film so as to expose a whole top of the semiconductor mesa, an edge of the first insulating film, and a step of the resin film. The whole top of the semiconductor mesa is exposed through the first opening. Therefore, the exposed top of the semiconductor mesa is covered by the ohmic metal. Accordingly, the contact resistance between the ohmic metal and the contact layer in the top of the semiconductor mesa is lowered.

In the method for manufacturing a semiconductor optical device according to the present invention, the width of the first opening may be larger than the width of the top surface of the semiconductor mesa added with twice of a thickness of the first insulating film.

In the method for manufacturing a semiconductor optical device according to the present invention, the step of depositing the ohmic metal preferably includes the steps of forming an overhang in edges of the first opening by a photoresist, depositing the ohmic metal on the top surface of the semiconductor mesa exposed through the first insulating film in the first opening, and a surface of the photoresist, and removing the ohmic metal deposited on the photoresist by using a lift-off method.

In the method for manufacturing a semiconductor optical device according to the present invention, the step of forming the stacked semiconductor layer may include a step of forming a buffer layer, a core layer, an upper cladding layer, and a contact layer on the substrate.

In the method for manufacturing a semiconductor optical device according to the present invention, in the step of forming the semiconductor mesa, the semiconductor mesa may have a height of 3 to 4 μm and a width of 1 to 2 μm. In addition, in the step of forming the resin film, the resin film may have a thickness of 2 to 3 μm at the top of the semiconductor mesa.

DESCRIPTION OF THE PREFERRED EMBODIMENTS

Next, some embodiments will be described as referring to drawings. In the description of the drawings, numerals or symbols same or similar to each other will refer to elements same or similar to each other without overlapping explanations.

Figure 1:
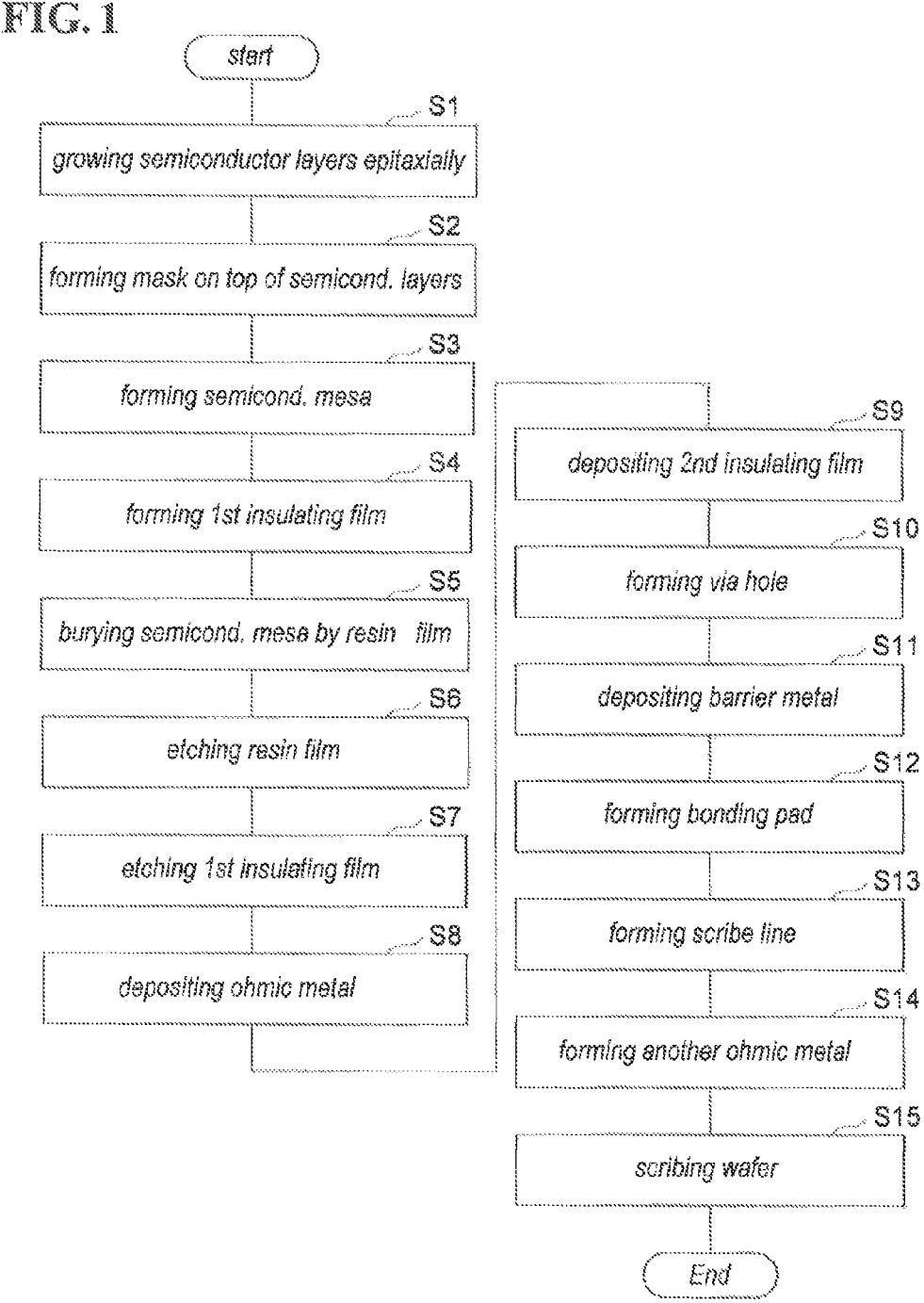
FIG. 1 is a flow chart of primary processes for a semiconductor optical device according to an embodiment of the present application.
Figure 2A:
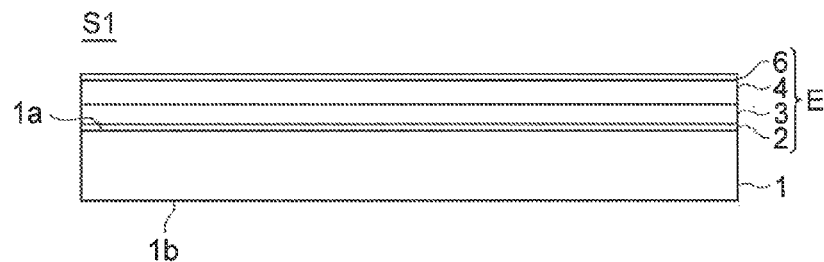
FIGS. 2A to 2D show cross sections of the semiconductor optical device in respective processes.

FIG. 1 shows primary steps of a process to form a semiconductor optical device. FIGS. 2 to 6 illustrate the primary steps of the process. Referring to FIG. 2A, the process first prepares a semiconductor substrate 1 that includes a top surface 1a and a back surface 1b. The semiconductor substrate 1, which is made of n-type semiconductor material grouped in the III-V compound semiconductor, is typically an n-type InP. The top surface 1a of the semiconductor substrate 1 stacks a buffer layer 2, a core layer 3, an upper cladding layer 4, and a contact layer 6 thereon in this order to constitute an epitaxial stack E at step S1. The buffer layer 2, which is made of material grouped in the III-V compound semiconductor with the first conduction type, is for instance, an n-type InP. The core layer 3, which is made of un-doped semiconductor materials also grouped in the III-V compound semiconductor, includes for instance, well layers each made of AlGaInAs and barrier layers each made of AlInAs. The upper cladding layer 4, which is made of material grouped in the III-V compound semiconductor with the second conduction type, is typically, a p-type InP. The contact layer 6, which is also made of material grouped in the III-V compound semiconductor with the second conduction type, is typically a p-type InGaAsP and/or a p-type InGaAs.

Figure 2B:
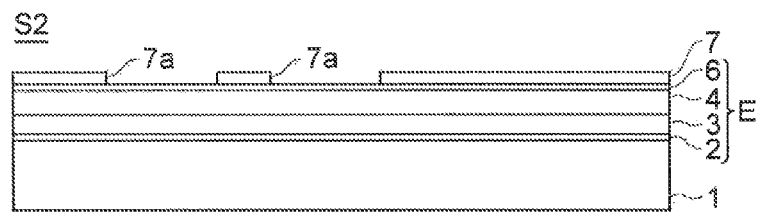

As shown in FIG. 2B, the process forms an etching mask 7 on the contact layer 6 at step S2. The etching mask 7 is made of an insulating film such as silicon die-oxide ($SiO_2$) formed by, for instance, thermal chemical vapor deposition (thermal CVD). The etching mask 7 includes an opening 7a. The opening 7a corresponds to a groove 8 (refer to FIG. 2C). After forming the insulating film on the contact layer 6, the etching mask 7 is formed by etching the insulating film by using a patterned photoresist as an etching mask. The thermal CVD may form the insulating film with substantially no damage on the surface of the contact layer 6 during the formation thereof. The thermal CVD is carried out at a substrate temperature of about 400° C. to 450° C. which is higher temperature than a curing temperature of a resin such as BCB resin.

Figure 2C:
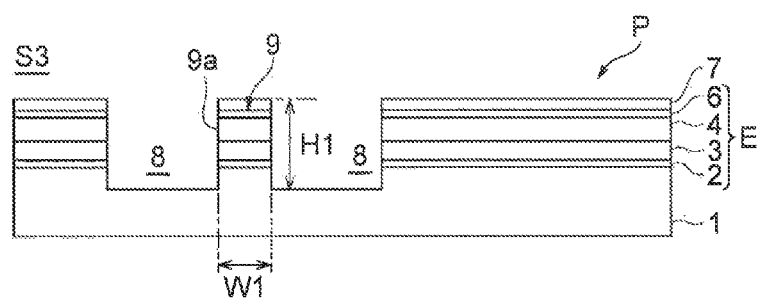

As shown in FIG. 2C, the process next etches the epitaxial stack E and the semiconductor substrate 1 by the etching mask 7. This etching forms grooves 8 in the contact layer 6, the upper cladding layer 4, the core layer 3, and the buffer layer 2 to form a semiconductor mesa 9 for an optical waveguide at step S3. The optical waveguide extends in a waveguide direction parallel to the direction along which the semiconductor mesa 9 extends. The process thus forms an intermediate material P including the patterned semiconductor mesa 9 on the semiconductor substrate 1.

The etching to form the semiconductor mesa 9 is preferably carried out by, what is called, a dry-etching using a reactive gas of hydrogen iodide (HI). The dry-etching may forms the semiconductor mesa with steep and plane side walls 9a so as to improve propagation characteristics of light in the optical waveguide including the semiconductor mesa. In particular, when the epitaxial stack E includes semiconductor materials of InP and the like substantially lattice matched with InP, the etching to form the semiconductor mesa 9 is preferably carried out by, what is called, the inductive coupled plasma reactive ion etching (ICP-RIE). The semiconductor mesa 9 formed in step S3 has a width W1 of wider than 1 µm but narrower than 2 µm. Here, the width W1 of the semiconductor mesa 9 is a width in a direction intersecting the waveguide direction along which the optical waveguide extends. The semiconductor mesa 9 preferably has a height H1, which is equivalent to a depth of the groove 8, of greater than 3 µm but smaller than 4 µm.

Figure 2D:
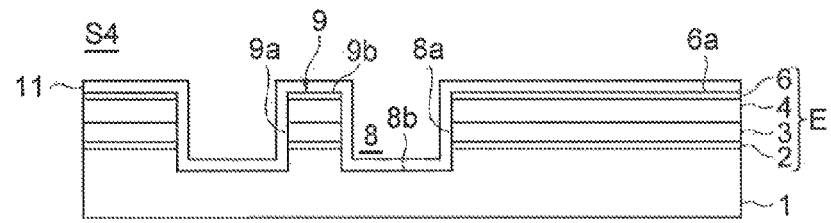

As shown in FIG. 2D, the process removes the etching mask 7, and forms an insulating film 11 also by the thermal CVD at step S4. In the embodiment, the insulating film 11 is a first insulating film. The insulating film 11, for instance, silicon die-oxide ($SiO_2$), silicon oxi-nitride (SiON), and/or silicon nitride (SiN) with a thickness of 0.1 to 0.3 µm. The insulating film 11 covers the sides (side surfaces) 9a and the top (top surface) 9b of the semiconductor mesa 9; sides (side surfaces) 8a and the bottom 8b of the grooves 8; and the top (top surface) 6a of the contact layer 6. During the formation of the insulating film 11, the semiconductor mesa 9 in the sides 9a thereof and the contact layer 6 in the top of the semiconductor mesa 9 are induced with substantially no damage by the thermal CVD.

Figure 3A:
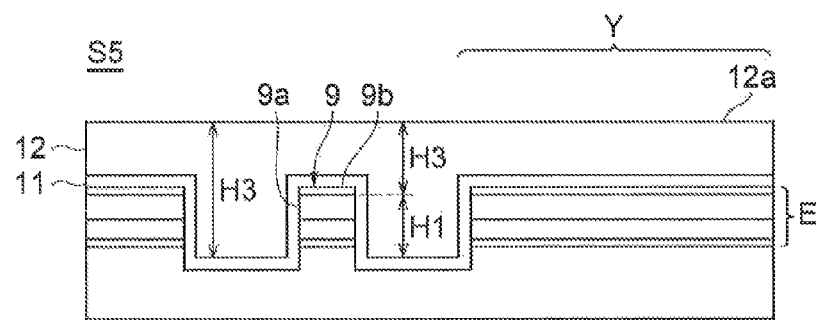
FIGS. 3A to 3C show cross sections of the semiconductor optical device in respective processes subsequent to that shown in FIG. 2D.

Subsequently, the process buries the grooves 8 by a resin film 12 at step S5 as shown in FIG. 3A. Specifically, the resin film 12 is formed on the insulating film 11 by a spin-coating method. The resin film 12 is preferably made of benzocyclobutene (BCB) resin. Other types of resin, such as, polyimide resin, photosensitive AL polymer commercially available from Asahi Glass Co., Ltd. and so on may be applicable to the resin film 12.

The thickness H3 of the resin film 12 at the groove 8 is greater than the height H1 of the semiconductor mesa 9. Specifically, the thickness H3 of the resin film 12 measured from the top 9b of the semiconductor mesa 9 to the top (top surface) 12a thereof is preferably greater than 2 µm but is 3 µm at most. Thus, the semiconductor mesa 9 is buried with the resin film 12 whose top 12a becomes planar.

Figure 3B:
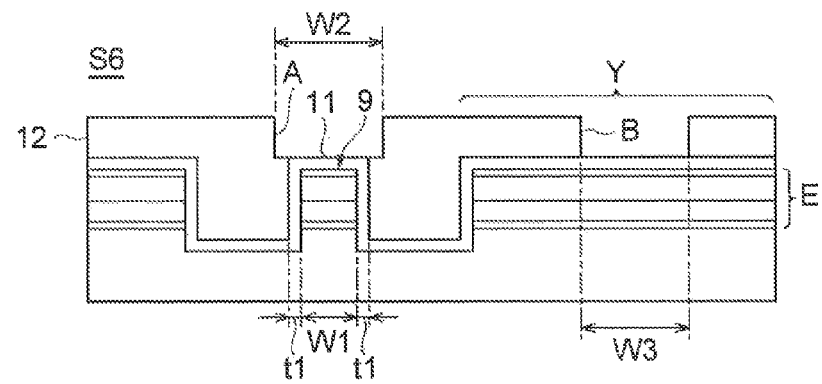

At step S6, the process forms an opening A in a portion of the resin film 12 corresponding to the top 9b of the semiconductor mesa 9 to expose the insulating film 11 on the top 9b of the semiconductor mesa 9 as shown in FIG. 3B. In the embodiment, the opening A is a first opening. The opening A is formed by the dry-etching using carbon fluoride ($CF_4$) contained with oxygen ($O_2$) as an etching gas. The dry-etching of the resin film 12 at step S6 is carried out until the top 9b of the mesa exposes, or an excess etching corresponding to the thickness of the insulating film 11 on the top 9b of the semiconductor mesa 9 is applicable. Practically, the dry-etching may be controlled by measuring the etching time.

The opening A preferably has a width W2 slightly wider than width W1 of the semiconductor mesa 9. The widths, W1 and W2, are measured along the direction intersecting the waveguide direction. Specifically, the former width W2 of the opening A is wider than the width W1 of the semiconductor mesa 9 plus the thickness t1 of the insulating film 11 on the sides 9a of the semiconductor mesa 9. Also, step S6 forms another opening B in a region Y of the resin film 12 concurrent with the formation of the opening A. The opening B preferably has a width of, for instance, 100 µm along a direction intersecting the waveguide direction.

Figure 3C:
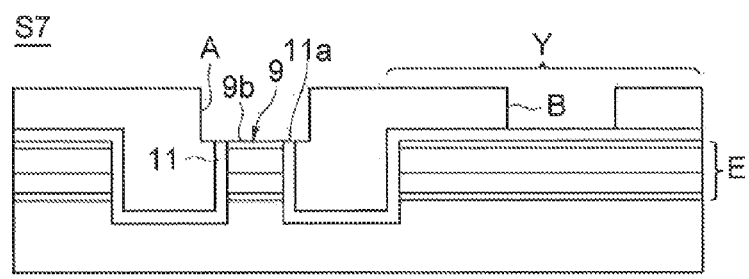

Then, in step S7, the insulating film 11 on the semiconductor mesa 9 is removed by etching to expose the top 9b of the semiconductor mesa 9 through the opening A as shown in FIG. 3C. The removal of the insulating film 11 may be performed by the dry-etching using carbon fluoride ($CF_4$) as the reactive gas. After step S7, the opening A exposes at least the top 9b of the semiconductor mesa 9 and the edges 11a of the insulating film 11 on the sides 9a of the semiconductor mesa 9.

Figure 4A:
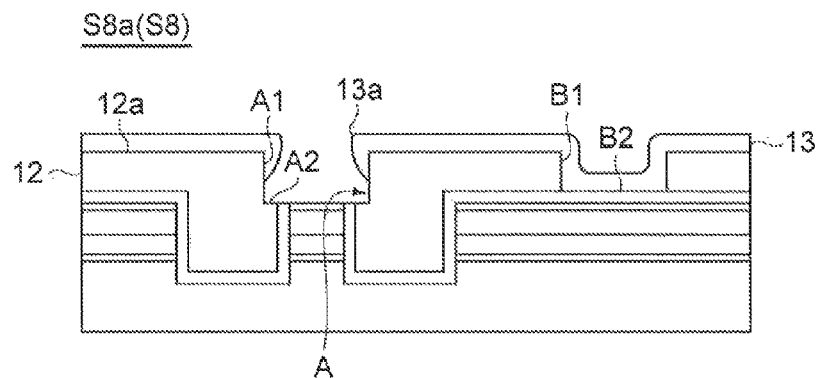
FIGS. 4A to 4C show cross sections of the semiconductor optical device in respective processes subsequent to that shown in FIG. 3C.

Then, step S8 deposits metals 15p, which makes a non-rectifying contact (that is, ohmic contact) against the contact layer 6, on the top 9b of the semiconductor mesa 9. Specifically, a mask layer 13 is prepared at step S8a, as shown in FIG. 4A. The mask layer 13 may be made of a positive photoresist. The mask layer 13 is formed by patterning the photoresist by using a conventional photolithography method. The mask layer 13 covers the top 12a of the resin film 12, the side A1 of the opening A, and the side B1 and the bottom B2 of the opening B. The mask layer 13 exposes a portion of the sides A1 and the bottom A2 of the opening A. In addition, the mask layer 13 has an overhang 13a in edges of the opening A by using the positive photoresist for patterning.

Figure 4B:
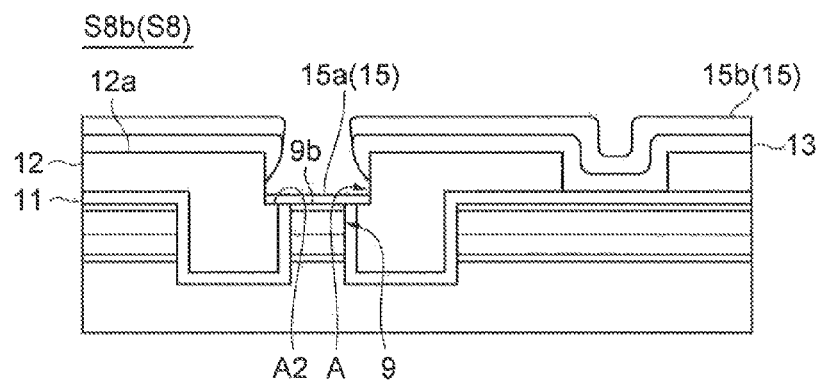
Figure 4C:
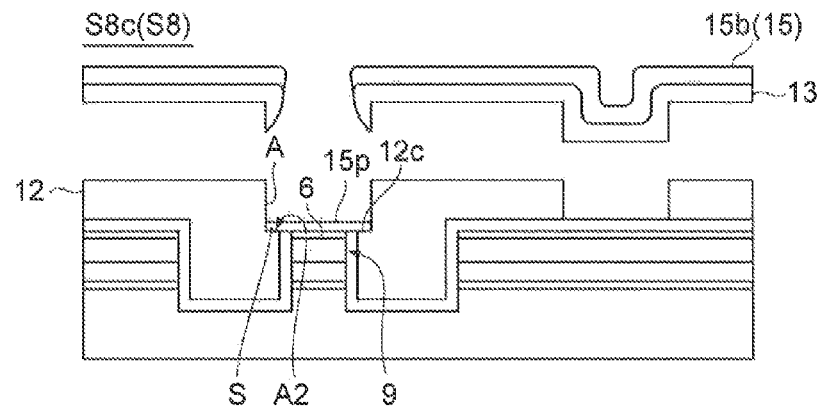

Then, as shown in FIG. 4B, further step S8b deposits a metal film 15 on the top 9b of the semiconductor mesa 9 and the mask layer 13 by, for instance, the evaporation. The metal film 15 exactly includes a portion 15a in the bottom A2 of the opening A, and another portion 15b on the mask layer 13. The bottom A2 of the opening A exactly includes the top 9b of the semiconductor mesa 9 and the edges 11a of the insulating film 11. The bottom A2 may further includes a step 12c of the resin film 12 formed by the etching for the opening A. The portion 15p of the metal 15 extending on the edges 11a and the steps 12c of the resin film 12 behaves as an extruding portion S protruded from the insulating film 11 along the lateral direction, or along the width W1, of the semiconductor mesa 9. The metal film 15 may stack metals of gold (Au), zinc (Zn) and gold (Au), which is denoted as Au/Zn/Au, in this order by the metal evaporation. In an alternative, the metal film 15 may stack Ti/Pt/Au in this order. The step S8c removes the portion of the metal film 15b deposited on the top of the mask layer 13 by, what is called, the lift-off technique, as shown in FIG. 4C. By the sequential steps, S8a to S8c, thus described, the ohmic metal, namely, the non-rectifying metal 15p is formed so as to be in contact with the top 9b of the semiconductor mesa 9. The metal 15p is also formed on the top 9b of the semiconductor mesa 9, the edges 11a of the insulating film 11, and the steps 12c of the resin film 12 (step S8).

The opening A has a depth corresponding to the thickness H4 of the resin film 12 in the region Y, which is practically 2 to 3 µm in the present embodiment. When the ohmic metal 15p is formed on the top 9b of the semiconductor mesa 9 by the lift-off technique subsequent to the metal evaporation, the mask layer 13 preferably has a thickness greater than the thickness H4. That is, the mask layer 13 preferably has a thickness of 3 to 4 µm. Also, when the width W2 of the opening A is comparable of the width W1 of the semiconductor mesa 9, which is 1 to 2 µm, the aspect ratio of the opening A increases. In addition, the process requires fine alignment to deposit the ohmic metal 15p on the top 9b of the semiconductor mesa 9. In the present embodiment, the width W2 of the opening A increases as compared with the width W1 of the semiconductor mesa 9.

Figure 5A:
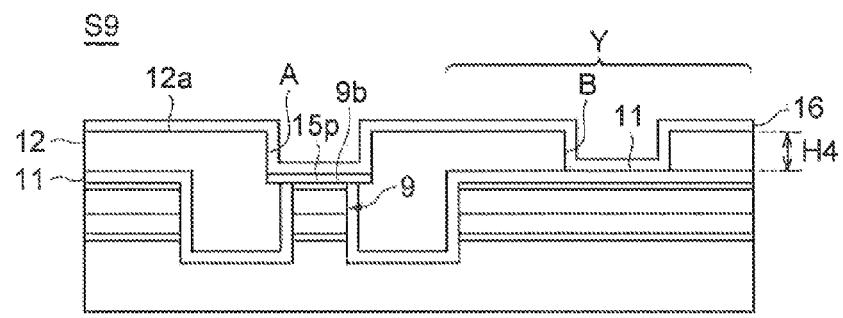
FIGS. 5A to 5C show cross sections of the semiconductor optical device in respective processes subsequent to that shown in FIG. 4C.

Referring to FIG. 5A, step S9 further deposits an insulating film 16 on the resin film 12 so as to protect the resin film 12. In the embodiment, the insulating film 16 is a second insulating film. In step S9, the resin film 12 in a temperature thereof is maintained below the curing temperature of the resin film 12 which is about 300° C. When the temperature of the resin film 12 exceeds the curing temperature, the resin film 12 deteriorates or degenerates thermally. Therefore, the sputtering is preferably applied to deposit the insulating film 16 because the sputtering may suppress the rise of the temperature of the resin film 12. However, the sputtering inherently induces substantial damages on the surface of the semiconductor layer to be deposited with the insulating film 16 thereon compared with the thermal CVD.

In the step S9, the insulating film 16 is formed on the ohmic metal 15p on the top 9b of the semiconductor mesa 9. The top 9b of the semiconductor mesa 9 is not exposed during the formation of the insulating film 16. Therefore, no damage provides in the top semiconductor layer (contact layer 6) of the semiconductor mesa 9 even when the insulating film 16 is formed by sputtering. The insulating film 16, similar to the former insulating film 11, is made of inorganic material, typically, $SiO_2$, SiON, SiN, and so on with a thickness of 0.1 to 0.4 μm. The insulating film 16 covers the top 12a of the resin film 12, the ohmic metal 15p exposed within the opening A, and the insulating film 11 exposed within the opening B.

Because the opening A inherently accompanies with a step whose height corresponds to the thickness H4 of the resin film 12 in the region Y, practically, 2 to 3 min in the present embodiment, the insulating film 16 is required to show good adhesion to the resin film 12 and a good step coverage. Therefore, the sputtering method is preferably used to form the insulating film 16 in the step S9 because the sputtering method improves the adhesion of the insulating film 16 to the resin film 12.

Because the insulating film 16 is formed after the formation of the ohmic metal 15p, the ohmic metal 15p is covered by the insulating film 16 in the region S extruding in respective sides of the semiconductor mesa 9. That is, the ohmic metal 15p is put extruding region S between the edge 11a of the insulating film 11 and the step 12c of the resin film 12, and the insulating film 16.

Figure 5B:
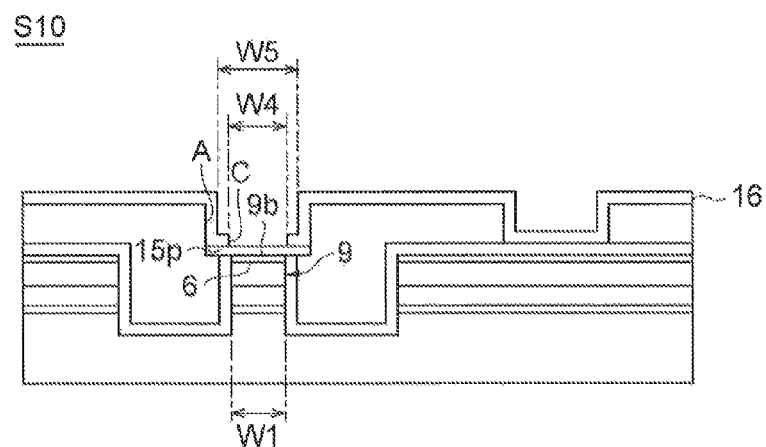

Then, the step S10 etches the insulating film 16 in the bottom of the opening A to form an opening C by the dry-etching using carbon fluoride ($CF_4$) as a reactive gas, as shown in FIG. 5B. In the embodiment, the opening C is a second opening. The opening C thus formed exposes the ohmic metal 15p on the top of the semiconductor mesa 9.

The opening C has a width W4 in a direction intersecting the waveguide direction. The width W4 of the opening C may be wider than the width W1 of the semiconductor mesa 9, because the ohmic metal 15p has a width W5 wider than the width W1 of the semiconductor mesa 9, which means that the edge 11a of the insulating film 11 and the step 12c of the resin film 12 are substantially covered by the ohmic metal 15p. Thus, the insulating film 11 and the resin film 12 are not substantially etched. The sides 9a of the semiconductor mesa 9, not only the top 9b of the semiconductor mesa 9, are protected from the etching.

Figure 5C:
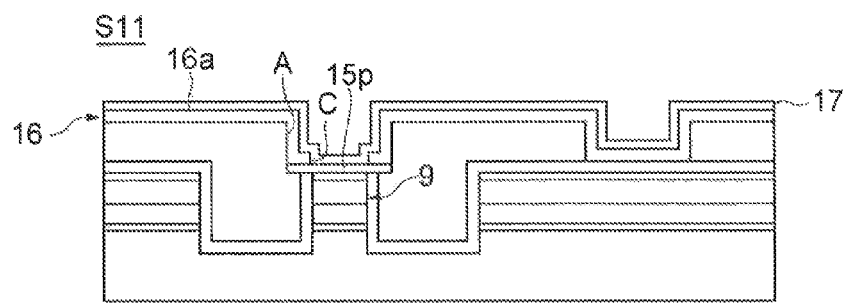

The process then forms a barrier metal 17 as shown in FIG. 5C at step S11. The barrier metal 17 covers the top 16a of the insulating film 16 and the ohmic metal 15p exposed within the opening C. The barrier metal 17 comprises a stack of titanium (Ti), platinum (Pt), and gold (Au) (that is, Ti/PT/Au) formed by, for instance, the metal evaporation and/or the metal sputtering. Another metal of titanium tungsten (TiW) and gold (Au) stacked on TiW (that is, TiW/Au) may be usable as the barrier metal.

Figure 6A:
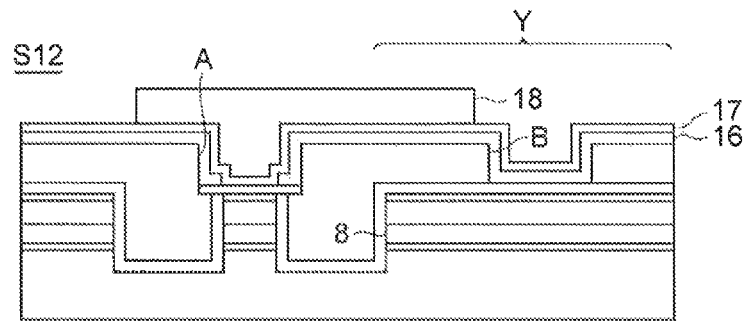
FIGS. 6A to 6D show cross sections of the semiconductor optical device in respective processes subsequent to that shown in FIG. 5C.
Figure 6B:
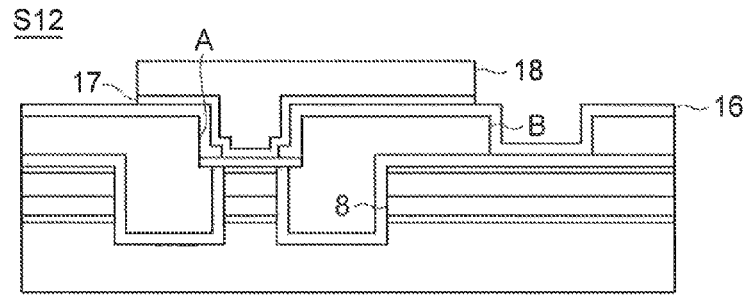

Subsequent step S12, as illustrated in FIG. 6A, forms a bonding pad 18 on the barrier metal 17 by plating gold (Au), for example. The bonding pad 18 includes a part formed in the opening A and another part formed on the regions Y between the groove 8 and the opening B. As shown in FIG. 6B, a part of the barrier metal 17 exposed through the bonding pad 18 is removed by etching.

Figure 6C:
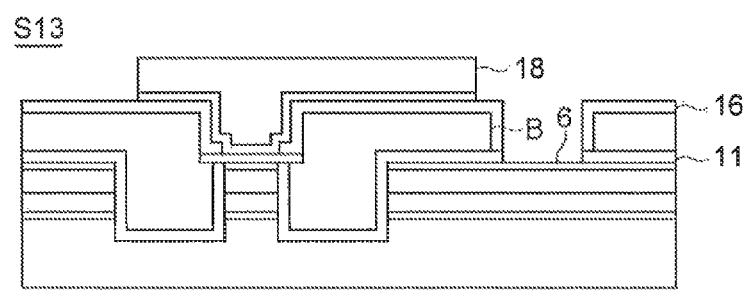

The next process S13 shown in FIG. 6C removes two insulating films, 11 and 16, in the opening B to expose the contact layer 6, which forms a scribe line in the along the opening B. Finally, the subsequent process S114 shown in FIG. 6D forms another metal film 19 on the back surface 1b of the semiconductor substrate 1, which is an ohmic metal for the cathode electrode of the device. The metal film 19 may be a stack of eutectic metal of gold-germanium (AuGe) with a cover layer of gold (Au), namely a stacked metal AuGe/Au, by the metal evaporation and/or the metal sputtering. The eutectic metal AuGe makes an ohmic contact to the semiconductor substrate 1. In an alternative, a metal stack of AuGe covered by another stacked metal of Ti/Pt/Au, namely, AuGe/Ti/Pt/Au, may be used.

Figure 6D:
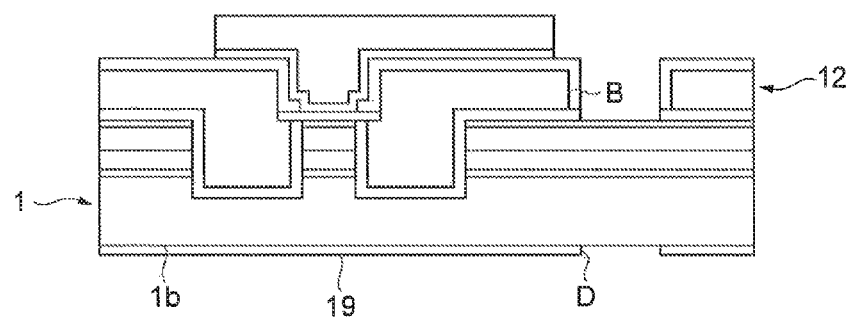

The process S14, as shown in FIG. 6D, etches a portion of the ohmic metal 19 beneath the opening B in the resin film 12 to form an opening D in the ohmic metal 19. Finally, by scribing the semiconductor substrate 1 along the openings, B and D at step S15, a semiconductor optical modulator is completed.

Figure 7:
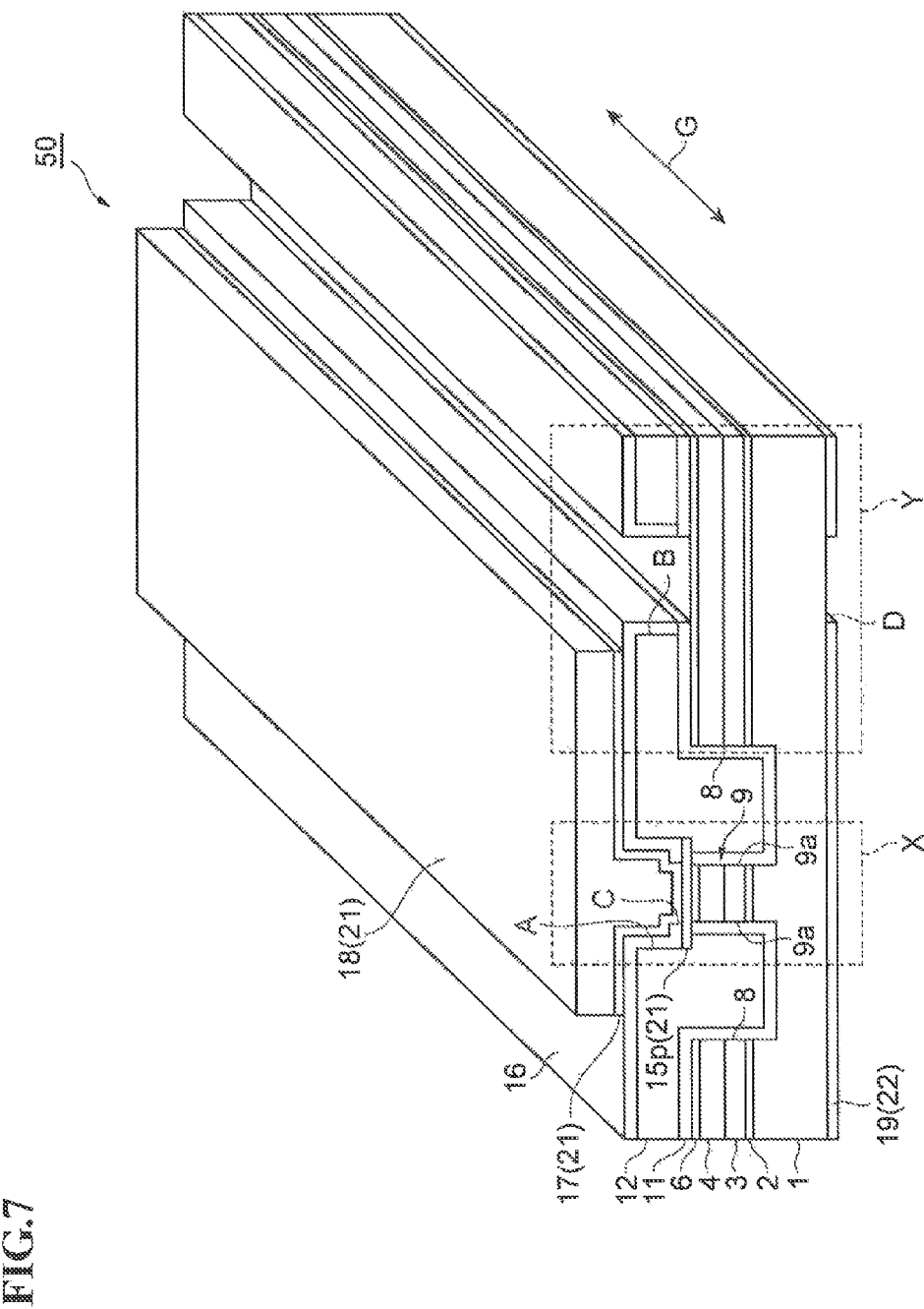
FIG. 7 is a perspective view of the semiconductor optical device formed according to the processes shown in FIGS. 2A to 6D before the device is scribed along the scribe line.

Next, a semiconductor optical modulator 50, where a manufacturing process thereof is thus described, will be explained. FIG. 7 is a perspective view showing a semiconductor optical modulator with a cross section thereof according to an embodiment of the present invention. FIG. 7 shows the semiconductor optical modulator before the scribing process.

The semiconductor optical device 50 includes a semiconductor substrate 1 with a semiconductor mesa 9 thereon. The semiconductor substrate 1, which partially operates as a support member to enhance mechanical toughness, includes a buffer layer 2.

The buffer layer 2 enhances the crystallographic quality of the core layer 3 formed thereon. The core layer 3 includes a multi-quantum well (MQW) structure having well layers and barrier layers alternately stacked to each other. The core layer 3, in an alternative, may include one quantum well layer where one well layer is put between two barrier layers. Or, the core layer 3 may be a bulk layer containing only one semiconductor material. The core layer 3 provides an upper cladding layer 4 thereon. The cladding layer 4, accompanied with the buffer layer 2, effectively confines light within the core layer 3. The upper cladding layer 4 provides a contact later 6 thereon to secure the ohmic contact against an ohmic metal.

As described above, the semiconductor mesa 9 includes a portion of the semiconductor substrate 1, the buffer layer 2, the core layer 3, the upper cladding layer 4, and the contact layer 6. The semiconductor optical device 50 further includes two grooves 8 in both sides of the semiconductor mesa 9 which constitutes an optical waveguide in a region X. That is, two grooves 8 forms the stripe-shaped semiconductor mesa 9. The semiconductor mesa 9 and the grooves 8 extend along the waveguide direction q, that is, the direction along which the light propagates. The grooves 8 is formed by etching the contact layer 6, the upper cladding layer 4, the core layer 4, the buffer layer 2, and a portion of the semiconductor substrate 1. The grooves 8 include the sides 9a of the semiconductor mesa 9. The semiconductor mesa 9, by securing a difference in the refractive index of the core layer 3 with respect to the two layers, namely, the upper cladding layer 4 and the buffer layer 2, and to regions in both sides of the core layer 3, may effectively confine the light within the core layer 3. The light primarily propagates within the core layer 3 along the semiconductor mesa 9.

The insulating film 11 not only electrically isolates the semiconductor region including the semiconductor mesa 9 from the outside but protects the region mechanically and chemically. The insulating film 11 in the top of the semiconductor mesa 9 is removed to secure an electrical connection between the anode electrode 21 and the contact layer 6.

The resin film 12 buries the sides 9a of the semiconductor mesa 9 by filling the grooves 8 in both sides 9a of the semiconductor mesa 9; and provides the bonding pad 18 of the anode electrode 21 thereon. Because the resin film 12 fully buries the semiconductor mesa 9, in particular, the sides 9a of the semiconductor mesa 9 is fully covered by the resin film 12, the semiconductor mesa 9 is restricted in the optical scattering and/or the optical absorption due to the metal to be attached to the sides 9a of the semiconductor mesa 9. The resin film 12 may reduce stray capacitance caused by the bonding pad 18 of the anode electrode 21 with respect to the back meal. Thus, the resin film 12 has a thickness greater than a depth H1 of the groove 8 (refer to FIG. 3A). That is, the resin film 12 has no depletion in a region corresponding to the groove 8.

Also, the resin film 12 provides two openings, A and B. The former opening A is formed above the semiconductor mesa 9, while, the latter opening B locates in a position apart from the semiconductor mesa 9. The former opening A provides the ohmic metal 15p, the barrier metal 17 and the pad 18 therein, while, the latter opening B provides no metals to operate as a scribe line.

The insulating film 16 covers the resin film 12. In particular, the insulating film 16 prevents the resin film 12 from absorbing moisture. The insulating film 16 also provides an opening C in the top of the semiconductor mesa 9.

The anode electrode 21 extends from the top 9b of the semiconductor mesa 9 to the top 16a of the insulating film 16. The anode electrode 21 of the present embodiment includes, from the lowest one, the ohmic metal 15p, the barrier metal 17, and the bonding pad 18.

The ohmic metal 15p extends in the bottom of the opening A in the resin film 12 so as to cover the top 9b of the semiconductor mesa 9. The anode electrode 21 makes a non-rectifying contact (ohmic contact) to the contact layer 6 by making the metal 15p in contact with the contact layer 6. A portion of the metal 15p, namely, a center portion of the metal 15p, is electrically connected to the barrier metal 17 through the opening C in the insulating film 16.

The barrier metal 17 is provided on the insulating film 16 on the resin film 12. Because the lowest member of the barrier metal 17 is titanium (Ii), and Ti is in contact with the insulating film 16, the adhesive of the barrier metal 17 to the insulating film 16 may be enhanced. The bonding pad 18 provides an area to which a bonding wire is bonded to electrically connect the anode electrode 21 with an external circuit.

The cathode electrode 22 includes an ohmic metal 19 provided in the back surface 1b of the semiconductor substrate 1. The cathode electrode 22 provides an opening D just beneath the opening B in the resin film 12 in a side of the top surface of the substrate 1. Two openings, B and D, provide a function of the scribe line.

Figure 8:
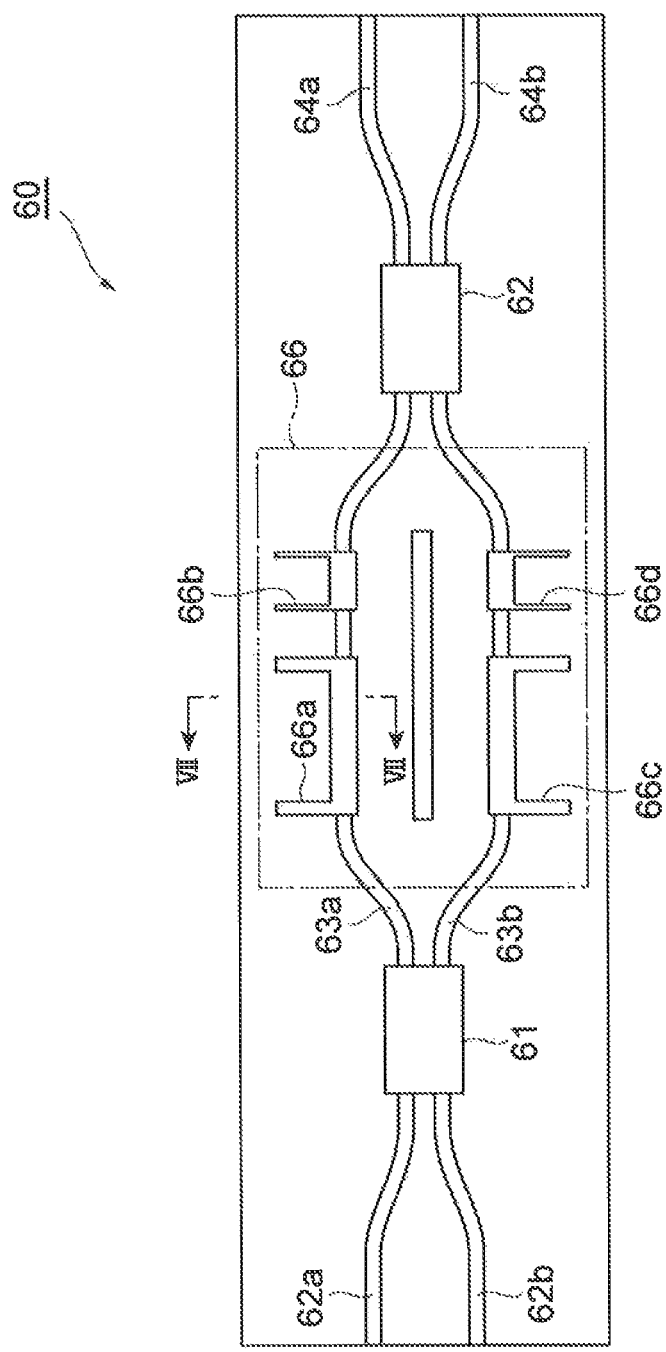
FIG. 8 is a plan view of a Mach-Zender (MZ) modulator implemented with a semiconductor optical device formed by the processes shown in FIG. 2A to 6D.

Next, an exemplary application of the semiconductor optical modulator 50 shown in FIG. 7 will be described as referring to FIGS. 8 to 10. FIG. 8 is a plan view of a semiconductor optical modulator with the type of, what is called, the Mach-Zender modulator. The Mach-Zender modulator (hereafter denoted as MZM) may modulate light by modulating phases of the light by electrical signals applied thereto.

Referring to FIG. 8, the MZM 60 includes two multi-mode interference (hereafter denoted as MMI) couplers, 61 and 62. The first MMI coupler 61 splits an input optical beam into two optical beams. The latter MMI coupler 62 mixes the optical beams each split by the former MMI coupler 61 and processed in the optical waveguides between the two couplers, 61 and 62, into one optical beam.

The former MMI coupler 61 receives two optical beams each propagating within respective optical waveguides, 62a and 62b. Two optical beams each output from the former optical coupler 61 enter the latter MMI coupler 62 after propagating in respective optical waveguides, 63a and 63b, where two optical beams are processed during the propagation between two MMI couplers, 61 and 62. Two optical beams entering the latter MMI coupler 62 are mixed by the latter MMI coupler 62 and two optical beams output from the latter MMI coupler 62 are externally output.

The MZM 60 provides, between two MMI couplers, 61 and 62, a modulating section 66 to vary a phase of the light propagating in one of two optical waveguides, 63a and 63b. The modulating section 66 includes, on the optical waveguide 63a, two electrodes, 66a and 66b, where the former electrode 66a receives a DC bias while the latter electrode 66b receives an AC signal. Also, the other waveguide 63b provides an electrode 66c to be applied with a DC bias and another electrode 66d to receive an AC signal. The former four electrodes, 66a to 66d, serve as a p-side electrode. An additional electrode 66e is formed between two optical waveguides, 63a and 63b. The electrode 66e serves as an n-side electrode. The MZM 60 may modulate light by applying electrical signals between at least one of the p-side electrodes, 66a to 66d, and the n-side electrode 66e.

FIG. 7 is a perspective view showing a cross section taken along the line VII-VII appearing in FIG. 8. That is, the optical waveguide 63a corresponds to the semiconductor mesa 9, while, the anode electrode 21 corresponds to the p-type electrode 66a.

Next, a method to produce a semiconductor optical device 90 comparable to those of the present application will be described. FIGS. 9A to 9D show processes to produce the semiconductor optical device 90. FIG. 10 is a perspective view of the semiconductor optical device 90.

Figure 9A:
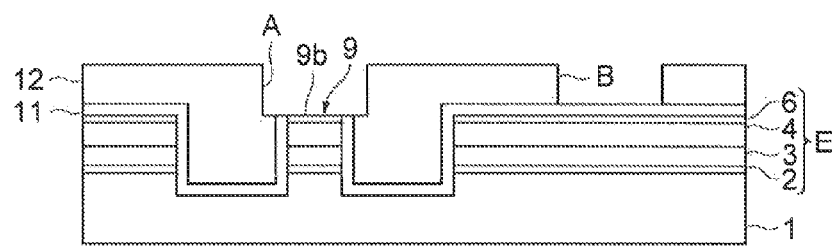
FIGS. 9A to 9D show processes for a semiconductor optical device according to a comparable example of the present application.
Figure 9B:
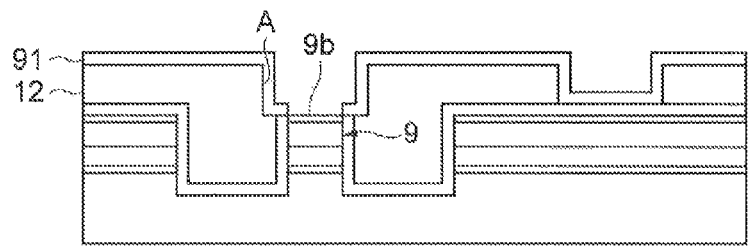
Figure 9C:
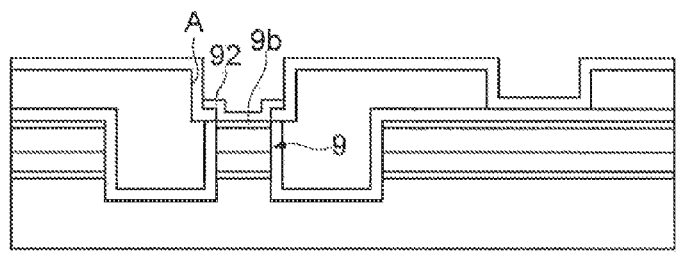
Figure 9D:
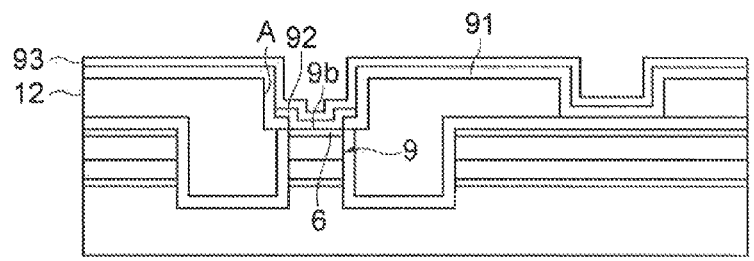
Figure 10:
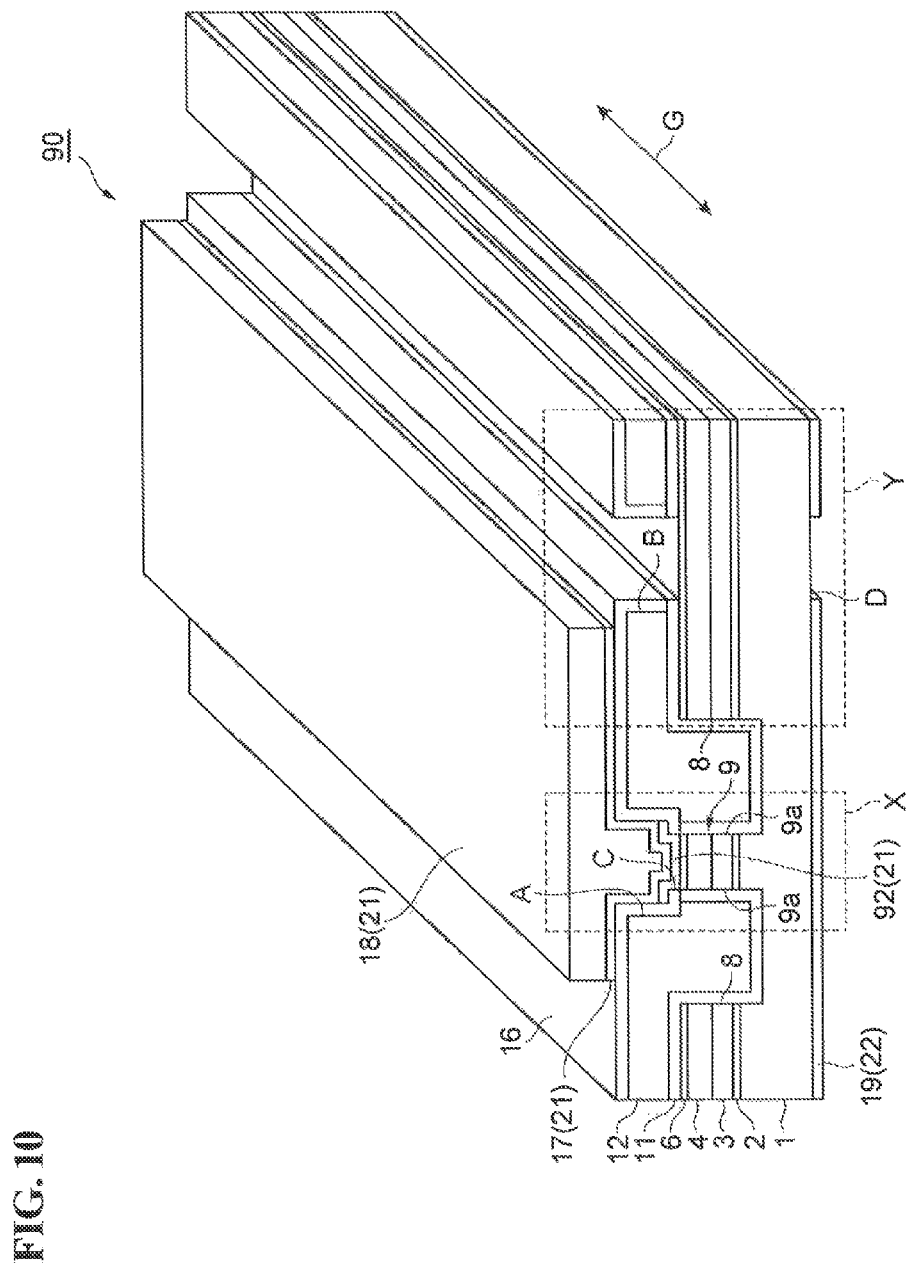
FIG. 10 is a perspective view of the comparable semiconductor optical device formed by the processes shown in FIGS. 9A to 9D.

As shown in FIG. 9A, the process comparable to the present process exposes the top 9b of the semiconductor mesa 9 at step S7 by etching the insulating film 11 after forming the opening A in the resin film 12 at step S6, which is same as those of the present application. Then, the process deposits an insulating film 91 to cover the resin film 12 by using sputtering method because of the formation of insulating film at a lower temperature than the curing temperature of the resin film 12. Then, the insulating film 91 formed in the bottom of the opening A is removed by etching. As a result of this etching, the top 9b of the semiconductor mesa 9 is exposed through the insulating film 91 as shown in FIG. 9B. A lift-off technique subsequent to the deposition of the ohmic metal 92 by the metal evaporation or the metal sputtering may leave the ohmic metal 92 in the bottom of the opening A so as to cover the top 9b of the semiconductor mesa 9 as shown in FIG. 9C. Finally, the barrier metal 93 is deposited on the ohmic metal 92 and the top of the insulating film 91 as shown in FIG. 9D. The processes subsequent to that shown in FIG. 9D are substantially same as those of the present application (that is, step S11 to S15 in the embodiment). Thus, the semiconductor optical device 90 shown in FIG. 10 is completed.

According to the processes thus described comparable to those of the present invention, the top 9b of the semiconductor mesa 9 is possibly damaged because the insulating film 91 is formed on the top 9b of the semiconductor mesa 9 by the sputtering. As mentioned above, the top 9b of the mesa 9 is possibly damaged during the formation of the insulating film 91 by the sputtering. In addition, in the processes to etch the insulating film 11 and the insulating film 91, the side 9a and the top 9b of the semiconductor mesa 9 are possibly damaged. Specifically, the insulating film 11 formed on the side 9a of the semiconductor mesa 9 and the insulating film 91 formed in the bottom of the opening A are over-etched and/or side-etched. As a result, the side 9b of the semiconductor mesa is exposed. These over-etching and side-etching of the insulating film 11 and the insulating film 91 provide the damages to the top semiconductor layer (contact layer 6) in the semiconductor mesa 9. These damages causes in the contact layer 6 degradation of the contact resistance between the ohmic metal 92 and the contact layer 6. In addition, the ohmic metal 92 is deposited on the exposed side surface of the semiconductor mesa 9. The deposition of the ohmic metal 92 on the side surface of the semiconductor mesa provides the damages to the semiconductor layer in the semiconductor mesa 9 and results in increasing a leakage current passing through the side-surface of the semiconductor mesa 9.

On the other hand, the process according to an embodiment of the present application forms the ohmic meal 15p before depositing the insulating film 16 by sputtering. The process to deposit the insulating film 16 is carried out such that the top 9b of the semiconductor mesa 9 is fully covered by the ohmic metal 15p. Thus, even when the insulating film 16 is deposited by the sputtering, the top 9b of the semiconductor mesa 9 becomes free from the process damages.

Also, in the process according to an embodiment of the present application, the ohmic metal 15p covers the top 9 of the semiconductor mesa 9 even when the insulating film 16 is etched to expose the top 9b of the semiconductor mesa 9 through the opening C. Thus, the top 9b of the semiconductor mesa 9 becomes free from the process damage during the etching of insulating film 16. In addition, the ohmic metal 15p includes the extruding region S covering the edge 11a of the insulating film 11 and the step 12c of the resin film 12. Therefore, in the process according to an embodiment of the present application, over-etching or side-etching of the insulating film 16 is prevented when the insulating film 16 is etched to expose the top 9b of the semiconductor mesa 9. The process according to embodiments of the present application may effectively suppress the damages affecting the top 9b of the semiconductor mesa 9, namely, the contact layer 6, which may also effectively suppress the increase of the contact resistance in addition to the increase of the leakage current.

The insulating film 16 containing silicon (Si) is formed on the resin film 12 including BCB resin by the sputtering. An insulating film formed by the sputtering shows a large adhesion to a resin film compared with that formed by, for example, CVD method. Therefore, the adhesion of the insulating film 16 to the resin film 12 may be enhanced. Moreover, because the peeling of the insulating film 16 off from the resin film 12 may be effectively suppressed, the wire-bonding to the bonding pad 18 is securely carried out.

Also, because the process to form the insulating film 11 on the contact layer 6 at step S4 is carried out by the thermal CVD, the top of the contact layer 6 is substantially free from the process damage.

The ohmic metal 15p is made of material containing gold (Au), which covers the top 9b of the mesa 9. Therefore, in step S10 in which the insulating film 16 is removed to form the opening C by the dry-etching using $CF_4$ gas, the ohmic metal 15p is hard to be etched, or, substantially no ohmic metal is etched by the dry-etching. Etching of the insulating film 16 is stopped when the ohmic metal 15p is exposed in the opening C. Therefore, the ohmic metal 15p protects the surface of the contact layer 6 from being damaged during step S10.

The process according to the present embodiment exposes the whole top 9b of the semiconductor mesa 9 by the etching of the resin film 12, and the exposed top 9b is covered by the ohmic metal 15p, which extends an area of the ohmic metal being in contact with the contact layer 6. Accordingly, the contact resistance between the ohmic metal 15p and the contact layer 6 in the top 9b of the mesa 9 may be lowered.

The resin film 12 is formed in thick, specifically, the resin film 12 is formed such that the top thereof becomes planar even in regions above the grooves 8. That is, the resin film 12 fully buries the grooves 8b in both sides of the mesa 9, the anode electrode 21 is easily formed in the region between two openings, A and B. Also, this arrangement where the anode electrode 21 is on the resin film 12, may reduce stray capacitance. Accordingly, the present arrangement may suppress the degradation of the device performance in high frequency regions as lowering the contact resistance against the contact layer.

The anode electrode 21 may be formed in a width thereof greater than a width of the mesa 9; namely, the anode electrode 21 fully covers the top 9b of the mesa 9, which means that, even when the insulating film 16 in a thickness thereof is scattered within a whole wafer, the damage caused in the top 9b of the mesa 9 during the sputtering and the etching of the insulating film 16 may be effectively reduced. The arrangement of the present embodiment may enhance to introduce wafers with a larger diameter.

In the foregoing detailed description, the method and apparatus of the present invention have been described with reference to specific exemplary embodiments thereof. However, it is evident that various modifications and changes may be made thereto without departing from the broader spirit and scope of the present invention.

For instance, the semiconductor optical modulator thus described provides the anode electrode in the side of the top surface of the semiconductor substrate 1, while, the cathode electrode is the back surface thereof. However, the semiconductor optical device may provide the anode electrode in the back surface of the semiconductor substrate 1. Also, the description above concentrates on an arrangement where the insulating films, 11 and 16, are made of $SiO_2$ and SiN; however, those films, 11 and 16, may be made of SiON, $Al_2O_3$, $TiO_2$, and so on.

Also, the process according to another embodiment may integrate active devices on the semiconductor substrate 1 to convert optical signals into electrical signals. The active devices may be, for instance, hetero-bipolar transistors and include passive elements of resistors and capacitors. Moreover, the process to produce the semiconductor optical device is applicable to active optical devices, such as a semiconductor laser diode, a semiconductor photodiode, and so on.

The description concentrates on the arrangement where the semiconductor substrate 1 has the n-type conduction. However, the semiconductor substrate may be the p-type conduction, or may be semi-insulating doped with iron (Fe). When the semiconductor substrate 1 is semi-insulating, the cathode electrode is formed in the top side of the substrate. Accordingly, the present specification and figures are accordingly to be regarded as illustrative rather than restrictive.

What is claimed is:

1. A method for manufacturing a semiconductor optical device comprising the steps of:
   forming a stacked semiconductor layer on a substrate;
   forming a semiconductor mesa on the substrate by etching the stacked semiconductor layer, the semiconductor mesa being defined by a groove on each side of the semiconductor mesa;
   forming a first insulating film on a side surface and a top surface of the semiconductor mesa;
   forming a resin film on the first insulating film, the resin film filling the grooves on both sides of the semiconductor mesa;
   etching the resin film on the semiconductor mesa to form a first opening in the resin film, the first insulating film being exposed through the first opening;
   etching the first insulating film exposed through the first opening to expose the top surface of the semiconductor mesa;
   depositing an ohmic metal on the top surface of the semiconductor mesa by the steps of:
   forming an overhang in edges of the first opening by a photoresist,
   depositing the ohmic metal on the top surface of the semiconductor mesa exposed through the first insulating film in the first opening, and a surface of the photoresist, and
   removing the ohmic metal deposited on the photoresist by using a lift-off method; and
   depositing a second insulating film on the ohmic metal and a surface of the resin film.

2. The method for manufacturing a semiconductor optical device according to claim 1,
   wherein, in the step of forming the resin film, the resin film includes a benzocyclobutene resin.

3. The method for manufacturing a semiconductor optical device according to claim 1,
   wherein the second insulating film contains silicon, and
   the step of depositing the second insulating film includes a step of depositing the second insulating film by sputtering.

4. The method for manufacturing a semiconductor optical device according to claim 1,
   wherein the step of depositing the first insulating film includes a step of depositing the first insulating film by thermal chemical vapor deposition technique.

5. The method for manufacturing a semiconductor optical device according to claim 1,
   wherein the step of depositing the ohmic metal includes a step of depositing a metal containing gold (Au).

6. The method for manufacturing a semiconductor optical device according to claim 1, further including the steps of:
   etching the second insulating film on the top surface of the semiconductor mesa to form a second opening, the ohmic metal being exposed through the second opening;
   depositing a barrier metal containing titanium (Ti) on the ohmic metal and the second insulating film; and
   forming a pad on the barrier metal.

7. The method for manufacturing a semiconductor optical device according to claim 1,
   wherein, in the step of etching the resin film, the first opening has a width larger than a width of the top surface of the semiconductor mesa, and
   the step of etching the first insulating film includes a step of etching the first insulating film so as to expose a whole top of the semiconductor mesa, an edge of the first insulating film, and a step of the resin film.

8. The method for manufacturing a semiconductor optical device according to claim 7,
   wherein the width of the first opening is larger than the width of the top surface of the semiconductor mesa plus twice the thickness of the first insulating film.

9. The method for manufacturing a semiconductor optical device according to claim 1, wherein the step of forming the stacked semiconductor layer includes a step forming a buffer layer, a core layer, an upper cladding layer, and a contact layer on the substrate.

10. The method for manufacturing a semiconductor optical device according to claim 1, wherein, in the step of forming the semiconductor mesa, the semiconductor mesa has a height of 3 to 4 μm and a width of 1 to 2 μm.

11. The method for manufacturing a semiconductor optical device according to claim 1, wherein, in the step of forming the resin film, the resin film has a thickness of 2 to 3 μm at the top surface of the semiconductor mesa.

* * * * *